United States Patent
Sakamoto et al.

(10) Patent No.: US 12,187,170 B2
(45) Date of Patent: Jan. 7, 2025

(54) MOVABLE BODY CONTROL DEVICE, MOVABLE BODY, MOVABLE BODY MANAGEMENT SYSTEM, MOVABLE BODY CONTROL METHOD, AND PROGRAM

(71) Applicant: HONDA MOTOR CO., LTD., Tokyo (JP)

(72) Inventors: Tomokazu Sakamoto, Wako (JP); Shinichiro Kobashi, Wako (JP); Takeshi Echizenya, Wako (JP); Taiki Iimura, Wako (JP); Takayuki Nakagawara, Tokyo (JP); Etsuko Takasugi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 575 days.

(21) Appl. No.: 17/330,449

(22) Filed: May 26, 2021

(65) Prior Publication Data
US 2021/0370805 A1 Dec. 2, 2021

(30) Foreign Application Priority Data
Jun. 1, 2020 (JP) .................................. 2020-095433

(51) Int. Cl.
*B60N 2/16* (2006.01)
*G05D 1/00* (2024.01)
*G06Q 10/0631* (2023.01)

(52) U.S. Cl.
CPC ....... *B60N 2/16* (2013.01); *G06Q 10/063114* (2013.01); *G05D 1/0246* (2013.01); *G05D 1/0278* (2013.01)

(58) Field of Classification Search
CPC . B60N 2/16; G06Q 10/063114; G05D 1/0246
See application file for complete search history.

(56) References Cited

U.S. PATENT DOCUMENTS

| 11,548,517 B2 * | 1/2023 | Golsch ................. H04L 67/306 |
| 2007/0228795 A1 * | 10/2007 | Boehme ................. E02F 9/166 |
| | | 297/354.1 |

(Continued)

FOREIGN PATENT DOCUMENTS

| JP | 2000-084006 | 3/2000 |
| JP | 2011-180033 | 9/2011 |

(Continued)

OTHER PUBLICATIONS

Japanese Office Action for Japanese Patent Application No. 2020-095433 mailed May 23, 2023.

*Primary Examiner* — James M McPherson
*Assistant Examiner* — Kyle J Kingsland
(74) *Attorney, Agent, or Firm* — Amin, Turocy & Watson, LLP

(57) ABSTRACT

A movable body control device controls a movable body on which a worker performing a work task at a workplace is capable of boarding and which is capable of adjusting the height of a boarding part on which the worker boards. The movable body control device includes: an acquisition part that acquires, from a terminal device that is carried by the worker and that accepts information which is input by the worker in accordance with the work task, information based on input information which is input by the worker in accordance with the work task; and a control part that controls the height of the boarding part based on the information which is acquired by the acquisition part.

12 Claims, 14 Drawing Sheets

(56) References Cited

U.S. PATENT DOCUMENTS

| | | | | |
|---|---|---|---|---|
| 2009/0198405 A1* | 8/2009 | Isono | ............... | B60G 17/0164 |
| | | | | 701/31.4 |
| 2017/0050542 A1* | 2/2017 | Shigeta | ................ | B60N 2/16 |
| 2021/0251826 A1 | 8/2021 | Takenaka et al. | | |
| 2022/0133558 A1* | 5/2022 | Campbell | ............ | B62K 11/007 |
| | | | | 180/6.5 |

FOREIGN PATENT DOCUMENTS

| | | |
|---|---|---|
| JP | 2012-040973 | 3/2012 |
| JP | 2019-079204 | 5/2019 |
| WO | 2019/244444 | 12/2019 |
| WO | 2020/012425 | 1/2020 |

* cited by examiner

MOVABLE BODY CONTROL DEVICE, MOVABLE BODY, MOVABLE BODY MANAGEMENT SYSTEM, MOVABLE BODY CONTROL METHOD, AND PROGRAM

CROSS-REFERENCE TO RELATED APPLICATION

Priority is claimed on Japanese Patent Application No. 2020-095433, filed on Jun. 1, 2020, the contents of which are incorporated herein by reference.

BACKGROUND

Field of the Invention

The present invention relates to a movable body control device, a movable body, a movable body management system, a movable body control method, and a program.

Background

In the related art, an autonomous movable body is disclosed that includes: a vehicle body which estimates a self-position on the basis of peripheral information, which autonomously moves on the basis of the self-position, and on which a passenger can board; a vehicle height restriction command reception means which receives a vehicle height restriction command of a vehicle body; and a vehicle height control means which controls the vehicle height of the vehicle body on the basis of the vehicle height restriction command (for example, Japanese Unexamined Patent Application, First Publication No. 2012-040973).

SUMMARY

Although the related art described above controls the vehicle height of the vehicle body in order to avoid contact between the passenger and a vehicle roof, convenience is not sufficient for a worker.

An aspect of the present invention intends to provide a movable body control device, a movable body, a movable body management system, a movable body control method, and a program that can improve convenience.

A movable body control device according to a first aspect of the present invention is a movable body control device that controls a movable body on which a worker performing a work task at a workplace is capable of boarding and which is capable of adjusting the height of a boarding part on which the worker boards, the movable body control device including: an acquisition part that acquires, from a terminal device that is carried by the worker and that accepts information which is input by the worker in accordance with the work task, information based on input information which is input by the worker in accordance with the work task; and a control part that controls the height of the boarding part based on the information which is acquired by the acquisition part.

A second aspect of the present invention is the movable body control device according to the first aspect described above, wherein the work task may be a work task by which the worker confirms information that is indicated by equipment which is provided at the workplace.

A third aspect of the present invention is the movable body control device according to the first or second aspect described above, wherein the input information may be information indicating that the work task has started, information that is indicated by equipment as a target of the work task, information indicating that the worker has confirmed information that is indicated by equipment which is provided at the workplace, or information indicating that the work task has been completed.

A fourth aspect of the present invention is the movable body control device according to the third aspect described above, wherein the control part may raise the height of the boarding part to a height in accordance with the work task in a case where the information indicating that the work task has started is acquired.

A fifth aspect of the present invention is the movable body control device according to the third or fourth aspect described above, wherein the control part may lower the height of the boarding part in a case where the information that is indicated by the equipment, the information indicating that the worker has confirmed the information that is indicated by the equipment which is provided at the workplace, or the information indicating that the work task has been completed is acquired.

A sixth aspect of the present invention is the movable body control device according to any of the first to fifth aspects described above, wherein the control part may control the height of the boarding part in a case where a predetermined condition in addition to acquiring the information based on the input information is further satisfied, and the predetermined condition may include some or all of: that the worker performs a predetermined gesture; that a code which is provided on a target of the work task and which becomes a trigger of an adjustment of height is recognized by the movable body control device or a device capable of communicating with the movable body control device; that the movable body control device or the device capable of communicating with the movable body control device acquires predetermined information from the target; that the movable body control device is present at a predetermined position relative to the target; that the movable body control device or the device capable of communicating with the movable body control device recognizes a position of the target in real time based on an image; and that a predetermined mechanism which is provided on the target is operated.

A seventh aspect of the present invention is the movable body control device according to any of the first to sixth aspects described above, wherein the control part may control the height of the boarding part based on the height of a target of the work task.

An eighth aspect of the present invention is the movable body control device according to any of the first to seventh aspects described above, wherein the control part may control the height of the boarding part in consideration of a body shape of the worker or a preference of the worker.

A ninth aspect of the present invention is a movable body on which the movable body control device according to any of the first to eighth aspects described above is mounted.

A tenth aspect of the present invention is the movable body according to the ninth aspect described above, wherein the movable body may include: a travel part that is located on the ground at the time of traveling; and a first support part and a second support part that are located on the ground at least in a case where the height of the boarding part is controlled.

An eleventh aspect of the present invention is a movable body management system including: the movable body control device according to any of the first to tenth aspects described above; and a server device that acquires input information from the terminal device and that provides information generated based on the acquired input information to the movable body control device.

A twelfth aspect of the present invention is a movable body control method by way of a computer that controls a movable body on which a worker performing a work task at a workplace is capable of boarding and which is capable of adjusting the height of a boarding part on which the worker boards, the movable body control method including: acquiring, from a terminal device that is carried by the worker and that accepts information which is input by the worker in accordance with the work task, information based on input information which is input by the worker in accordance with the work task; and controlling the height of the boarding part based on the information which is acquired.

A thirteenth aspect of the present invention is a computer-readable non-transitory recording medium which includes a program causing a computer that controls a movable body on which a worker performing a work task at a workplace is capable of boarding and which is capable of adjusting the height of a boarding part on which the worker boards to: acquire, from a terminal device that is carried by the worker and that accepts information which is input by the worker in accordance with the work task, information based on input information which is input by the worker in accordance with the work task; and control the height of the boarding part based on the information which is acquired.

According to the first to thirteenth aspects described above, since the movable body control device controls the height of the boarding part based on the information based on the input information which is input in accordance with the work task, it is possible to improve convenience to the worker.

According to the second aspect described above, the worker can easily confirm the equipment. This is because, for example, the height of the boarding part can be controlled such that the worker can easily confirm the equipment.

According to the fourth aspect described above, since the height of the boarding part is raised to the height in accordance with the work task, the worker can easily perform the work task.

According to the sixth aspect described above, since the control part controls the height of the boarding part in a case where the predetermined condition is further satisfied, convenience to the worker is improved.

According to the eighth aspect described above, since the control part additionally considers the body shape or the preference of the worker, the boarding part can be controlled to a height further suitable for the worker.

According to the tenth aspect described above, in a case where the height is controlled, the first support part and the second support part are located on the ground, and therefore, the stability of the movable body is improved.

DESCRIPTION OF EMBODIMENTS

Hereinafter, a movable body management system that includes a movable body control device, a movable body, a movable body management system, a movable body control method, and a program according to embodiments of the present invention will be described with reference to the drawings. The movable body control device controls a movable body on which a worker performing a work task at a workplace is capable of boarding and which is capable of adjusting the height of a boarding part on which the worker boards. The movable body control device is, for example, mounted on the movable body described above and performs a variety of processes in a coordinated manner with another device included in the movable body management system.

First Embodiment

Figure 1:
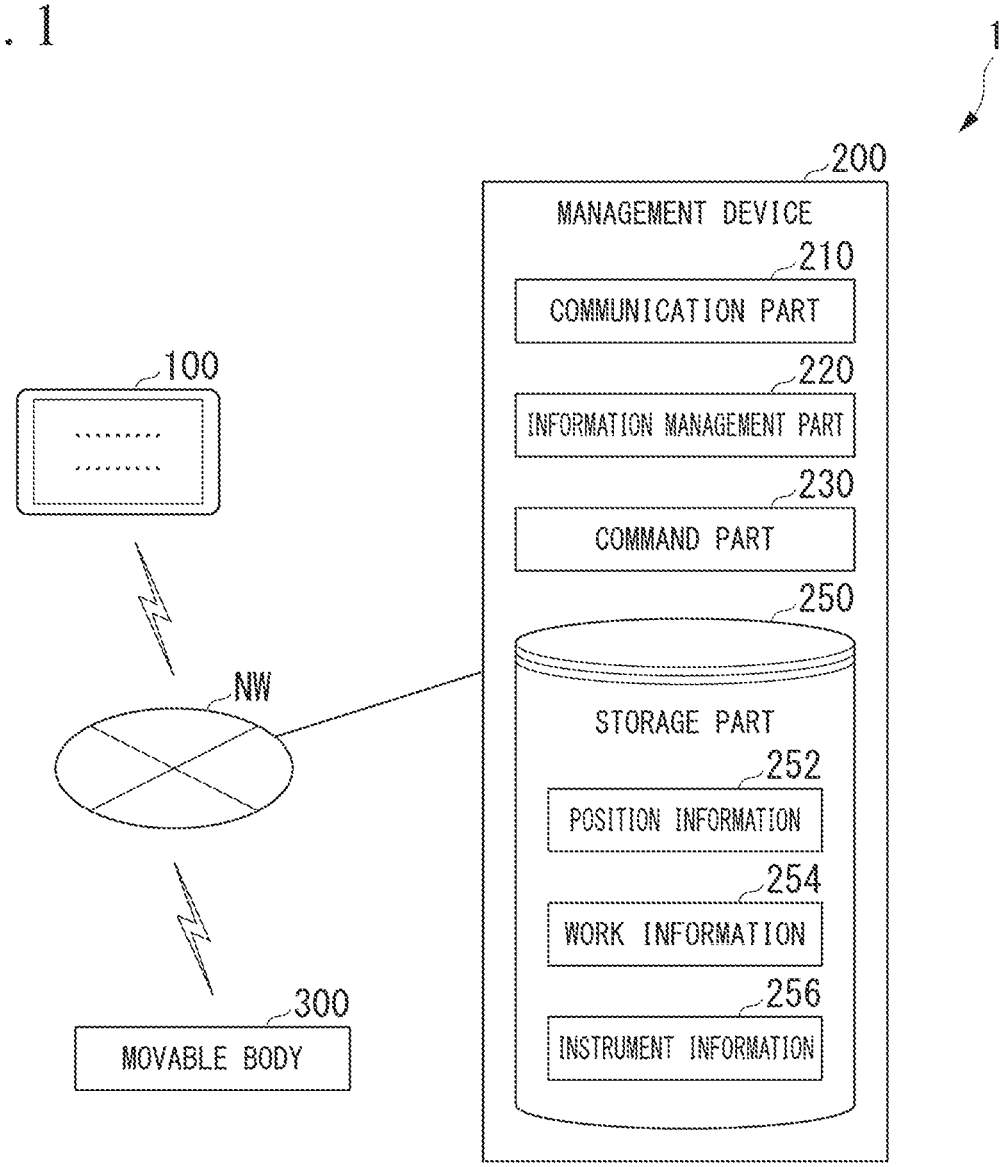
FIG. 1 is a view showing an example of a functional configuration of a movable body management system.

[Overall Configuration]
FIG. 1 is a view showing an example of a functional configuration of a movable body management system 1. The movable body management system 1 includes a terminal device 100, a management device 200, and a movable body 300. The terminal device 100, the management device 200, and the movable body 300 communicate with one another through a network NW. The network NW includes the Internet, a WAN (Wide Area Network), a LAN (Local Area Network), a public line, a provider device, a dedicated line, a wireless base station, and the like. A control device included in the management device 200 or the movable body 300 is an example of a "movable body control device".

[Terminal Device]
The terminal device 100 is, for example, a smartphone, a tablet terminal, or the like. In the terminal device 100, an application program, a browser, or the like for utilizing a service provided by the movable body management system 1 is started, and the service described below is supported. In the following description, it is assumed that the terminal device 100 is a tablet terminal, and the application program (service application) for receiving the service is started. The service application communicates with the management device 200 in response to an operation of a worker, transmits information that is input by the worker to the management device 200, and performs information supplement based on information that is received from the management device 200.

[Management Device]

The management device 200 includes, for example, a communication part 210, an information management part 220, a command part 230, and a storage part 250. The information management part 220 and the command part 230 are implemented, for example, by a processor such as a CPU (Central Processing Unit) as hardware executing a program (software). Some or all of the information management part 220 and the command part 230 may be implemented by hardware (a circuit part including circuitry) such as an LSI (Large-Scale Integration), an ASIC (Application-Specific Integrated Circuit), a FPGA (Field-Programmable Gate Array), or a GPU (Graphics-Processing Unit) or may be implemented by software and hardware in cooperation. The program may be stored in advance in a storage device (a storage device including a non-transitory storage medium) such as a HDD (Hard Disk Drive) or a flash memory. The program may be stored in a removable storage medium (a non-transitory storage medium) such as a DVD or a CD-ROM and be installed in the storage device by the storage medium being mounted on a drive device. The storage part 250 is implemented by a HDD (Hard Disc Drive), a DVD, a RAM (Random-Access Memory), a flash memory, or the like. The storage part 250 stores position information 252, work information 254, instrument information 256, and the like. The position information 252 includes time-series position information of the movable body 300. Details of other information are described below.

The communication part 210 is, for example, a wireless communication module for connecting to a network NW or communicating directly with another terminal device or the like. The communication part 210 performs wireless communication on the basis of Wi-Fi, DSRC (Dedicated Short-Range Communications), Bluetooth (Registered Trademark), or other communication standards.

The information management part 220 manages information that is provided by the terminal device 100 or the movable body 300. For example, the information management part 220 stores the information that is provided by the terminal device 100 or the movable body 300 in the storage part 250. The information management part 220 provides the information stored in the storage part 250 (information obtained based on the information stored in the storage part 250) to the terminal device 100 or the movable body 300.

The command part 230 provides a command to the movable body 300 on the basis of the information that is provided by the terminal device 100. The command is a command regarding a direction in which the movable body 300 proceeds, the height of the movable body 300, and the like. Further, the command may include a speed, a route, a trajectory, and the like when the movable body proceeds to a destination.

[Movable Body]

Figure 2:
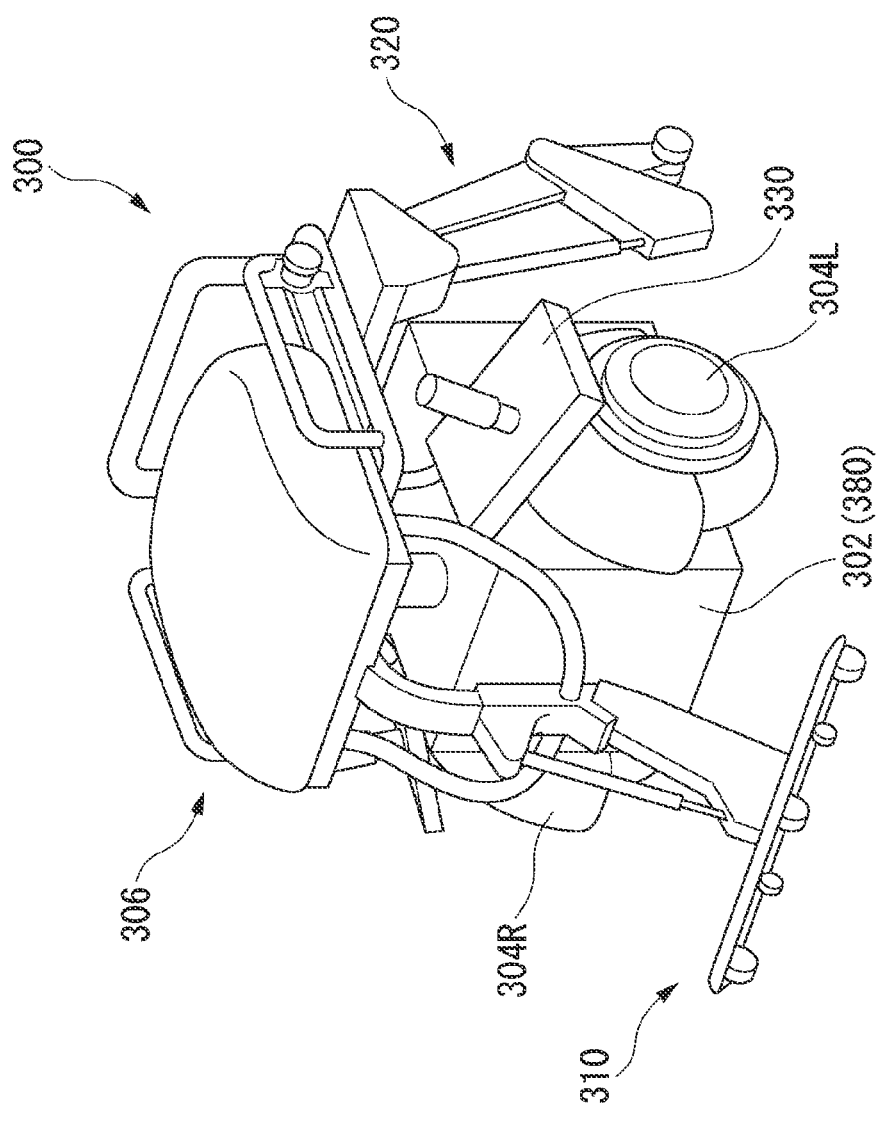
FIG. 2 is a perspective view showing a movable body.

FIG. 2 is a perspective view showing the movable body 300. Hereinafter, a front-to-rear direction of the movable body may be referred to as an X direction, a lateral direction may be referred to as a Y direction, and a direction perpendicular to the X direction and the Y direction may be referred to as a Z direction. The movable body 300 is a movable body on which a worker performing a work task at a workplace is capable of boarding and which is capable of adjusting the height of a boarding part on which the worker boards.

The movable body 300 includes, for example, a base body 302, a wheel 304R and a wheel 304L that are attached to the base body 302, a cushion-like seat part 306 on which a passenger is seated, a lifting mechanism 308 (refer to FIG. 3 described below) that drives the seat part 306, a first support part 310, a second support part 320, and an operation part 330. A control device 380 described below, a motor, a battery, and the like are accommodated inside the base body 302.

The wheel 304R and the wheel 304L are an example of a "travel part". The seat part 306 is an example of a "boarding part". The present embodiment is described using an example that utilizes the movable body 300 as shown in FIG. 2; however, a movable body is not limited to the movable body 300 as shown in FIG. 2 and may be a movable body in which a worker rides on a step in a state of standing. Further, a mechanism such as an endless track may be used in place of the wheel 304R and the wheel 304L.

The wheel 304R is provided on a +Y direction side of the movable body 300. The wheel 304L is provided on a -Y direction side of the movable body 300. The wheel 304R and the wheel 304L are driven by the motor. The seat part 306 is arranged above the base body 302. An upper surface of the seat part 306 is a seat surface that supports the hip of the passenger from below. The seat part 306 is supported by the base body 302 via the lifting mechanism 308. Details of the first support part 310 and the second support part 320 are described below.

The operation part 330 includes an operation element for the worker to control an operation of the movable body 300. For example, the operation element is an operation element for controlling the speed of the movable body 300, a braking operation, and the lifting mechanism 308.

Figure 3:
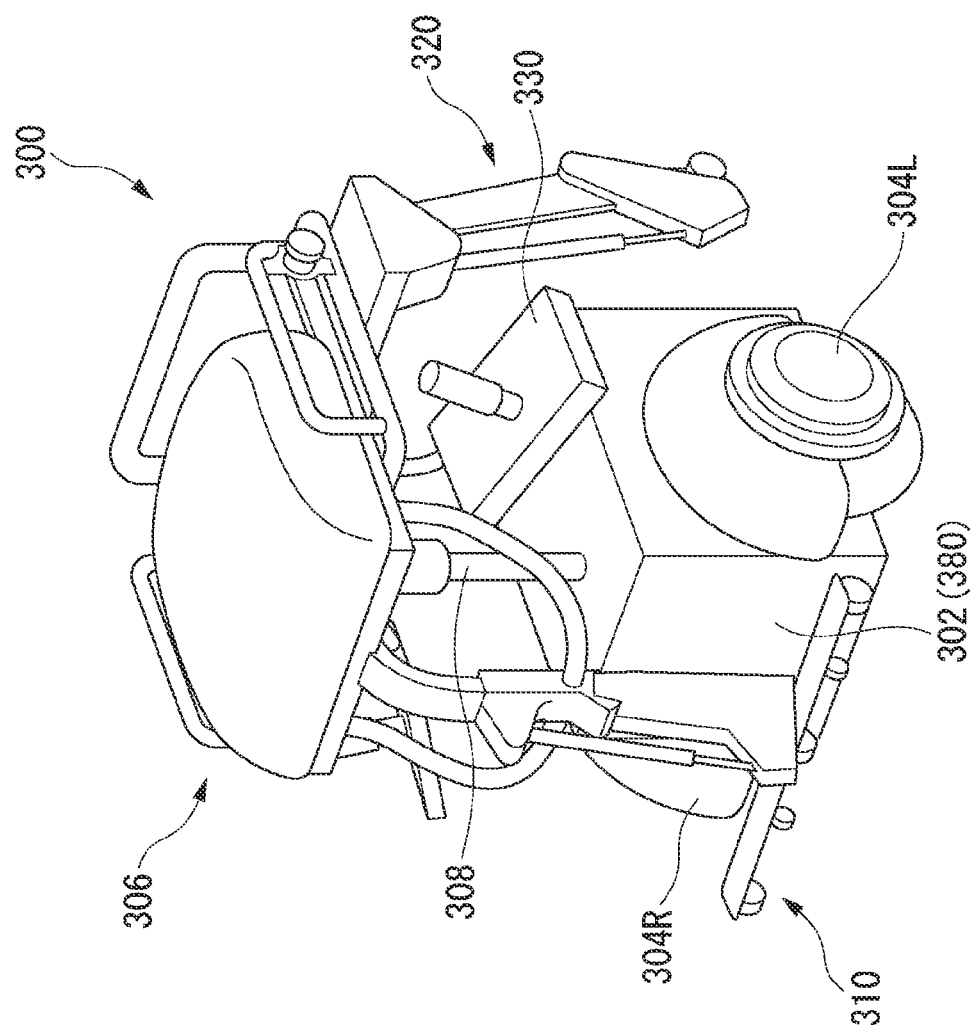
FIG. 3 is a perspective view of a movable body in a case where a seat part is raised by an operation of a lifting mechanism.

FIG. 3 is a perspective view of the movable body 300 in a case where the seat part 306 is raised by an operation of the lifting mechanism 308. FIG. 3 is a perspective view of the movable body 300 when the seat part 306 is raised by the operation of the lifting mechanism 308. The lifting mechanism 308 is an actuator that is formed of, for example, a motor and a ball screw. However, the configuration of the lifting mechanism is not limited thereto and may be, for example, a hydraulic mechanism or a rack-and-pinion mechanism. The lifting mechanism 308 is controlled by the control device 380 and supports the seat part 306 such that the seat part 306 is capable of being raised and lowered relative to the base body 302.

Figure 4:
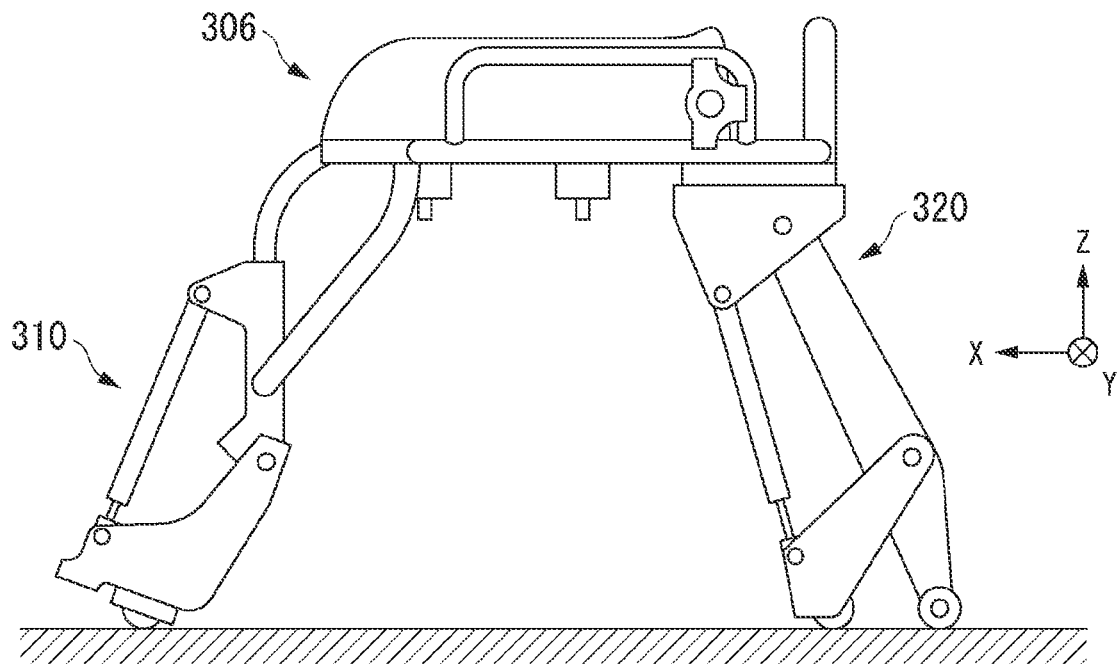
FIG. 4 is a view showing a first support part and a second support part.
Figure 5:
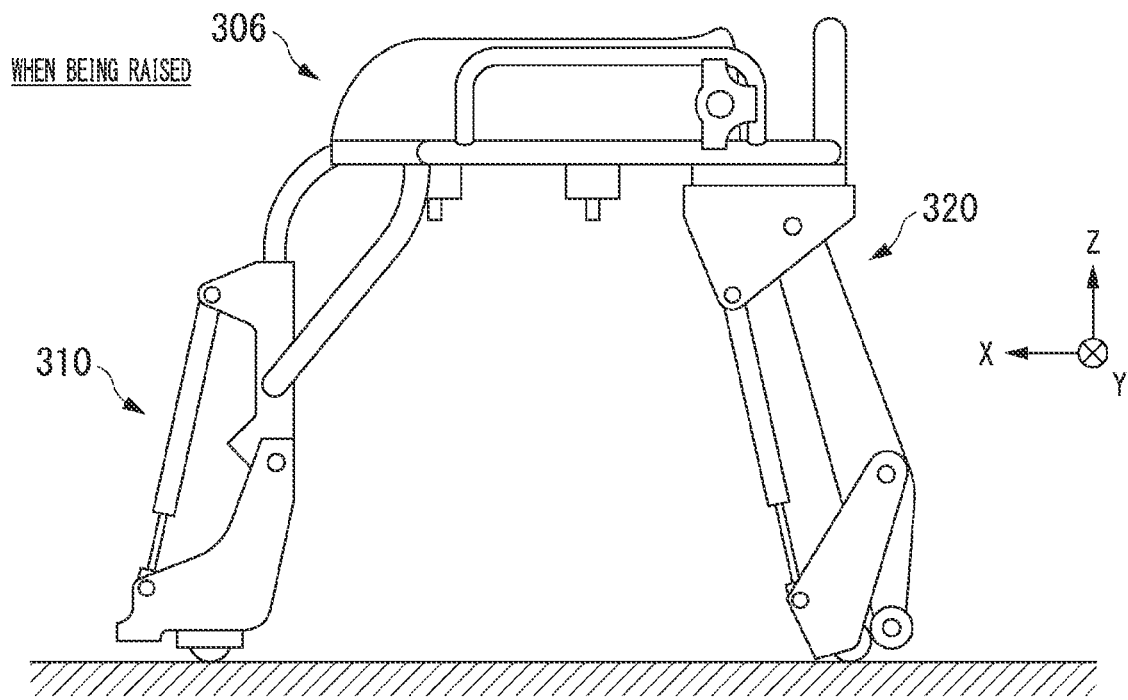
FIG. 5 is a view showing the first support part and the second support part in a case where the height of the seat part is raised.

FIG. 4 is a view showing the first support part 310 and the second support part 320. FIG. 4 and FIG. 5 which will be described below are views of the seat part 306, the first support part 310, and the second support part 320 when seen from the -Y direction. In FIG. 4 and FIG. 5, configurations other than the seat part 306, the first support part 310, and the second support part 320 are omitted.

The first support part 310 is provided on an end part in the +X direction of the seat part 306, extends in a ground direction, and supports the movable body 300 as needed. The second support part 320 is provided on an end part in the -X direction of the seat part 306, extends in the ground direction, and supports the movable body 300 as needed.

The first support part 310 and the second support part 320 are controlled, for example, by a control mechanism 322 (refer to FIG. 6) such as an actuator formed of a motor and a ball screw. The control mechanism 322 is controlled by a control device 380. A ground contact part such as a wheel or a stopper is provided at end parts of the first support part 310 and the second support part 320 on a side close to the ground surface. The first support part 310 and the second support part 320 may have a passive mechanism that comes into contact with the ground in accordance with the height of the seat part 306 by the self-weight of the first support part 310 or the second support part 320, a spring mechanism (suspension), or the like. Further, the first support part 310 and the second support part 320 have a lock mechanism of a movable portion, and the lock mechanism is operated by a control.

For example, when the worker boards the movable body 300, the lifting mechanism 308 controls the seat part 306 to a lower position on the basis of a control of the control device 380. In accordance with the height of the seat part 306, the ground contact part of the first support part 310 and the second support part 320 is controlled to be located on the ground.

Thereby, for example, the stability when the worker boards the movable body 300 is ensured. When the movable body 300 travels, the first support part 310 and the second support part 320 may be controlled such that the ground contact part is not located on the ground. Thereby, the travel performance of the movable body 300 is improved.

FIG. 5 is a view showing a state of the first support part 310 and the second support part 320 in a case where the height of the seat part 306 is raised. For example, it is assumed that in a case where the worker is boarding the movable body 300, the lifting mechanism 308 raises the height of the seat part 306 on the basis of the control of the control device 380. In this case, in accordance with the height of the seat part 306, for example, the ground contact part of the first support part 310 and the second support part 320 are controlled to be located on the ground by the control of the control mechanism 322 described above, the passive mechanism, or the like. For example, in a case where the height of the seat part 306 of FIG. 5 is higher than the height of the seat part 306 of FIG. 4 described above, each of the first support part 310 and the second support part 320 is controlled to approach the center of the seat part 306 with respect to the X direction, and the ground contact part is located on the ground. Further, at this time, the first support part 310 and the second support part 320 are locked by the lock mechanism described above. Thereby, for example, even in a case where the height of the seat part 306 is raised, the stability of the movable body 300 is ensured.

The first support part 310 and the second support part 320 may have a stretchable or retractable configuration in place of the functional configuration described above. In this case, when the seat part 306 is controlled, the first support part 310 and the second support part 320 may extend and be located on the ground, or the first support part 310 and the second support part 320 may emerge from a storage part and be located on the ground.

Figures 6, 7:
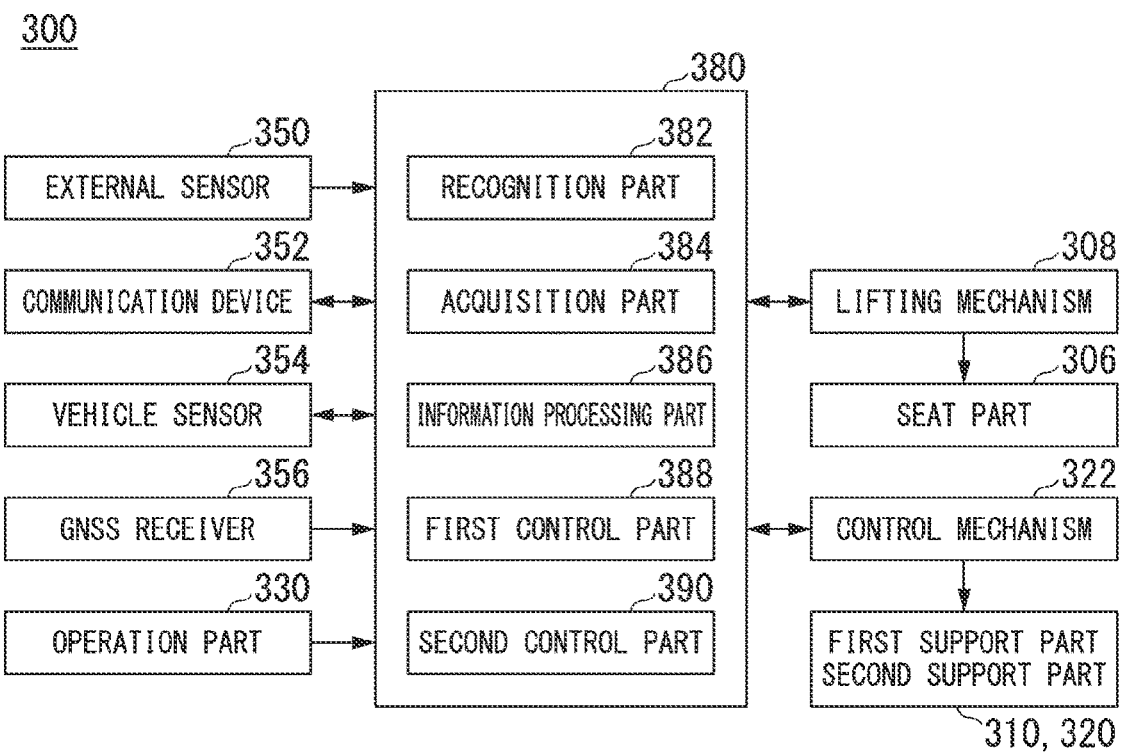
FIG. 6 is a view showing an example of another functional configuration included in the movable body.
FIG. 7 is a view showing an example of work information stored in a storage part of a management device.

FIG. 6 is a view showing an example of another functional configuration included in the movable body 300. The movable body 300 includes, for example, an external sensor 350, a communication device 352, a vehicle sensor 354, a GNSS receiver 356, a secondary battery (not shown), a control device 380, and the like in addition to the functional configuration described above.

The external sensor 350 is, for example, a camera, a laser range finder, an infrared sensor, or the like, and is a functional configuration capable of detecting a situation and an object around the movable body 300. The external sensor 350 is set, for example, at a position where the periphery (for example, the front) of the movable body 300 can be imaged. For example, the external sensor 350 is provided on an end portion of the operation part 330 on the +X direction side or the like. In the following description, as an example, the external sensor 350 is a camera.

The communication device 352 is, for example, a wireless communication module for connecting to the network NW or communicating directly with another terminal device or the like. The communication device 352 performs wireless communication on the basis of Wi-Fi, DSRC, Bluetooth, or other communication standards.

The vehicle sensor 354 is a sensor that detects the speed, the acceleration, the angular speed around the vertical axis, or the like of the movable body 300.

The GNSS receiver 356 measures the self-position on the basis of radio waves arriving from a GNSS satellite (for example, a GPS satellite). The GNSS receiver 356 outputs the positioning result to the control device 380.

The control device 380 includes, for example, a recognition part 382, an acquisition part 384, an information-processing part 386, a first control part 388, and a second control part 390. These functional configurations are implemented, for example, by a processor such as a CPU as hardware executing a program (software). Some or all of these functional configurations may be implemented by hardware (a circuit part including circuitry) such as an LSI, an ASIC, a FPGA, or a GPU or may be implemented by software and hardware in cooperation. The program may be stored in advance in a storage device (a storage device including a non-transitory storage medium) such as a HDD or a flash memory. The program may be stored in a removable storage medium (a non-transitory storage medium) such as a DVD or a CD-ROM and be installed in the storage device by the storage medium being mounted on a drive device.

The recognition part 382 recognizes an object around the movable body 300 on the basis of an image captured by the external sensor 350. The recognition part 382 recognizes, for example, the presence or absence of an obstacle, the situation of a road on which the movable body travels, the kind of an object that is present in the vicinity, the position of the object, and the like.

The acquisition part 384 acquires information that is acquired by the communication device 352 or acquires information that is acquired by the vehicle sensor 354 or the GNSS receiver 356. The acquisition part 384 acquires, from the terminal device 100 that is carried by the worker and that receives information which is input by the worker in accordance with the work task, information based on input information which is input by the worker in accordance with the work task. Details of the input information will be described later.

The information-processing part 386 manages the information that is acquired by the acquisition part 384 or controls each item of equipment (equipment other than the equipment as a control target of the first control part 388 and the second control part 390) included in the movable body 300.

The first control part 388 controls the motor of the movable body 300 to cause the movable body 300 to travel. The first control part 388 causes the movable body 300 to travel on the basis of an operation of the operation part 330 or a command of the management device 200.

The second control part 390 controls the lifting mechanism 308 or the control mechanism 322. The second control part 390 controls the lifting mechanism 308 on the basis of an operation of the operation part 330 or a command of the management device 200.

The second control part 390 controls the height of the seat part 306 on the basis of the information that is acquired by the acquisition part 384.

[Process Related to Work Task]

The worker boards the movable body 300, moves within a predetermined facility, and performs a work task. The facility is, for example, a facility having a predetermined size such as a substation but is not limited thereto. The work task is, for example, a work task in which a worker performs confirmation, an operation, or treatment of the equipment in a facility or the like. In the following description, as an example, a worker performs a work task of confirming the information indicated by an instrument at a facility such as a substation.

FIG. 7 is a view showing an example of the work information 254 that is stored in the storage part 250 of the management device 200. The work information 254 is information in which a work schedule, the type of work task that is performed by the worker, the equipment (instrument) as a work target, the location (position information) of the work target, the height of the work target, and the like are associated with one another.

Figure 8:
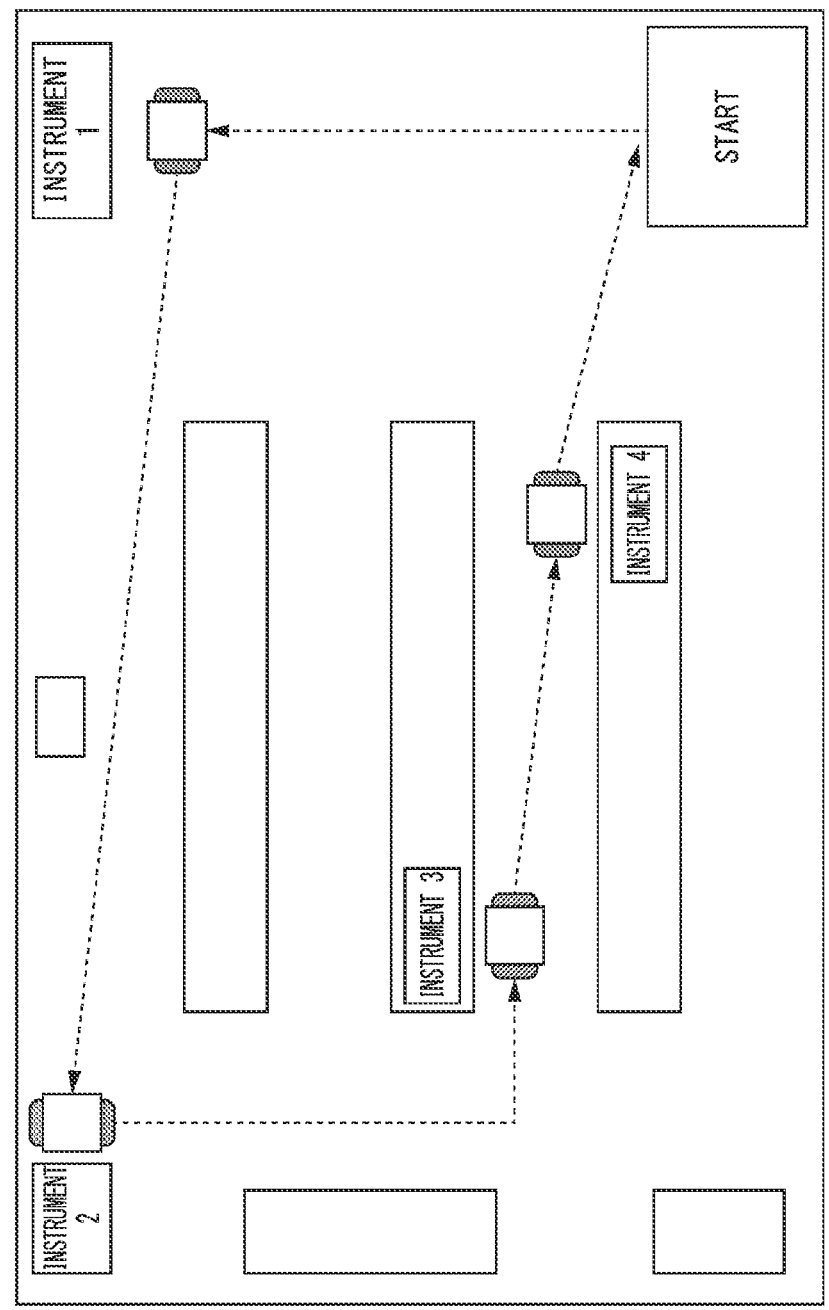
FIG. 8 is a view showing a work schedule.

FIG. 8 is a view showing a work schedule. For example, the work schedule is a schedule of confirming the information indicated by the instrument in order of an instrument 1, an instrument 2, an instrument 3, and an instrument 4.

For example, when a worker operates the terminal device 100, starts a service application, and performs a predetermined operation, the service application of the terminal device 100 cooperates with the management device 200. For example, a display part of the terminal device 100 displays identification information of the movable body 300 used by the worker, a work schedule, equipment as a work target included in the work schedule, information in which the equipment and map information of the facility are associated with each other (for example, information as shown in FIG. 8).

Figure 9:
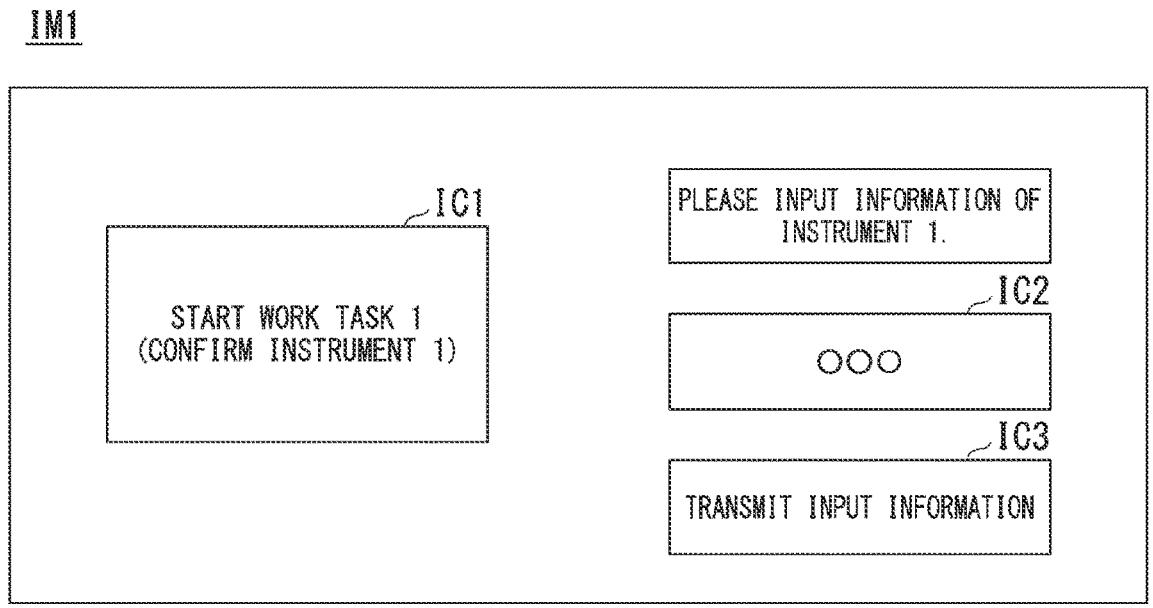
FIG. 9 is a view showing an example of an image.

In a case where the worker boards a designated movable body 300 and, for example, arrives near the instrument 1, an image IM is displayed on the display part of the terminal device 100. FIG. 9 is a view showing an example of an image IM1. The movable body 300 may be moved by an operation of the worker. The movable body 300 may be moved on the basis of an instruction of the management device 200. In this case, the management device 200 causes the movable body 300 to travel toward a destination on the basis of the position information of the movable body 300.

The image IM may be displayed when the worker performs a predetermined operation of the terminal device 100. Alternatively, the terminal device 100 may display the image IM on the display part when the movable body 300 arrives near the instrument 1 on the basis of the position information of the movable body 300.

The image IM includes an icon IC1, an icon IC2, and an icon IC3. The icon IC1 is a button operated when a work task 1 is started. The icon IC2 is an icon in which the information indicated by the instrument 1 is input. For example, in a case where the icon IC1 is operated, when the worker operates the icon IC2, a numeric keypad or the like is displayed on the display part. The worker operates the numeric keypad and inputs the information indicated by the instrument 1. When the worker operates the icon IC3, the information input to the icon IC2 is transmitted to the management device 200.

Information indicating that the icon IC1, the icon IC2, or the icon IC3 is operated is an example of input information. Information indicating that the icon IC1 is operated is an example of "information indicating that the work task has started". Information that is indicated by the instrument 1 and that is input to the icon IC2 is an example of "information that is indicated by equipment" or "information indicating that the worker has confirmed information that is indicated by equipment which is provided at the workplace". Information indicating that the icon IC3 is operated is an example of "information indicating that the work task has been completed" or "information indicating that the worker has confirmed the information indicating equipment which is provided at the workplace". "Information based on input information" is information (for example, information which commands that the height of the seat part 306 is controlled) transmitted to the movable body 300 by the management device 200 in response to the acquisition of the input information described above by the management device 200.

Figure 10:
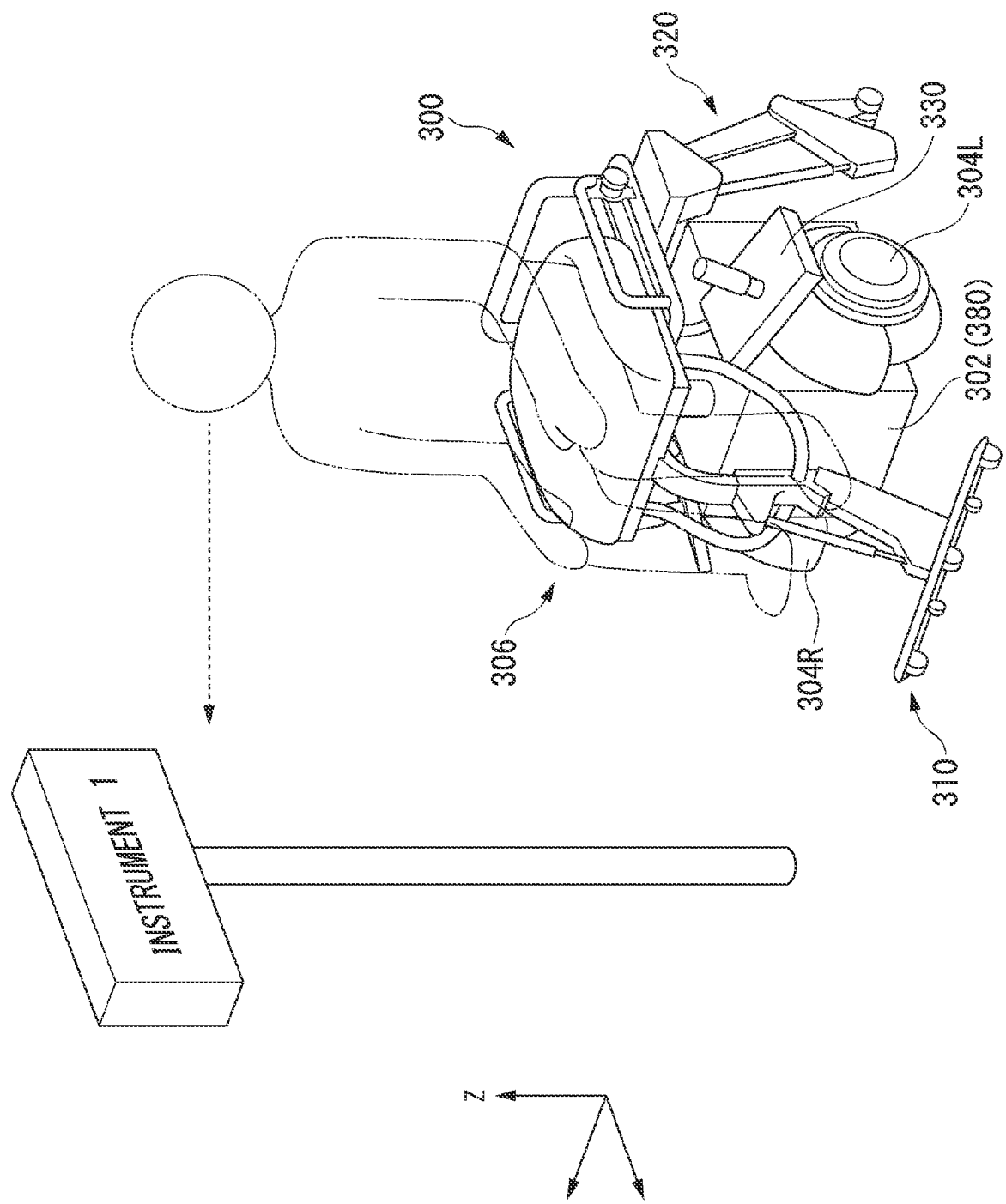
FIG. 10 is a view showing an example of the movable body before adjusting the height.
Figure 11:
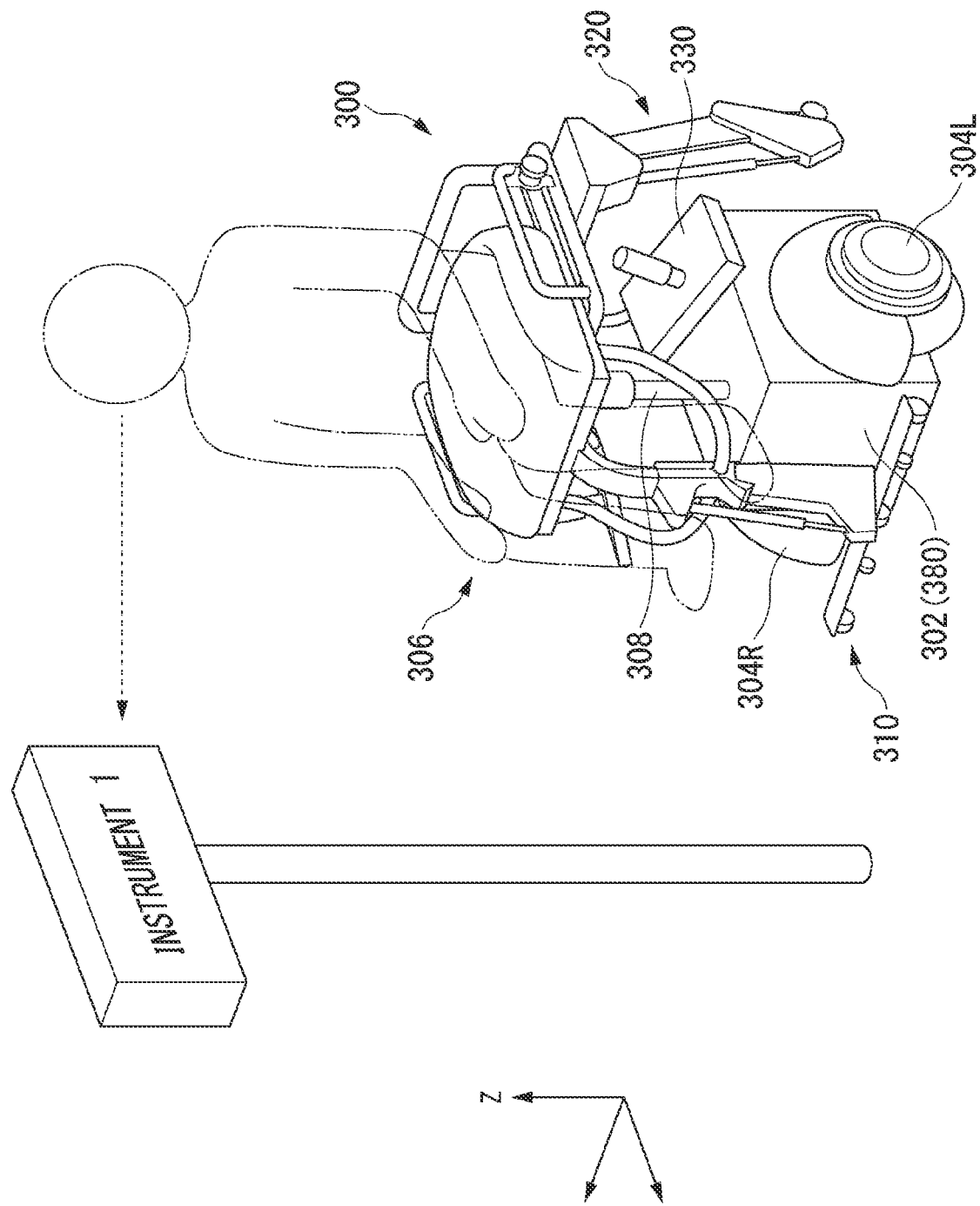
FIG. 11 is a view showing an example of the movable body of which the height is adjusted.

In response to the operation of the icon, the height of the seat part 306 of the movable body 300 is automatically adjusted as shown in FIG. 10 and FIG. 11. FIG. 10 is a view showing an example of the movable body 300 before adjusting the height. For example, there may be a case in which the height of the instrument 1 is higher than the height of the eye line of the worker who boards the movable body 300. In this case, it is necessary for the worker to step off the movable body 300, ride on a stepstool or the like depending on the height of the instrument 1, and confirm the information indicated by the instrument 1. However, stepping off the movable body 300 and performing the work task is less convenient for the user and is inefficient.

In the present embodiment, for example, when the icon IC1 is operated, the seat part 306 of the movable body 300 is automatically adjusted to a height in accordance with the instrument 1. FIG. 11 is a view showing an example of the movable body 300 of which the height is adjusted. Thereby, the worker can easily confirm the information indicated by the instrument 1 in a state where the worker is seated on the seat part 306.

Further, when the worker operates the icon IC3, the height of the seat part 306 is automatically adjusted to the height before the icon IC1 is operated. Thereby, the worker can promptly proceed to the next work task.

The above-described process in which the height is adjusted may be started on the condition that the worker has performed a predetermined operation in addition to the operation of the icon. The predetermined operation is, for example, an operation of the operation part 330 of the movable body or an operation of the terminal device 100. The predetermined operation is, for example, a simpler operation than an operation in which the worker operates the operation part 330 and adjusts the height of the seat part 306 as usual.

[Sequence View]

Figure 12:
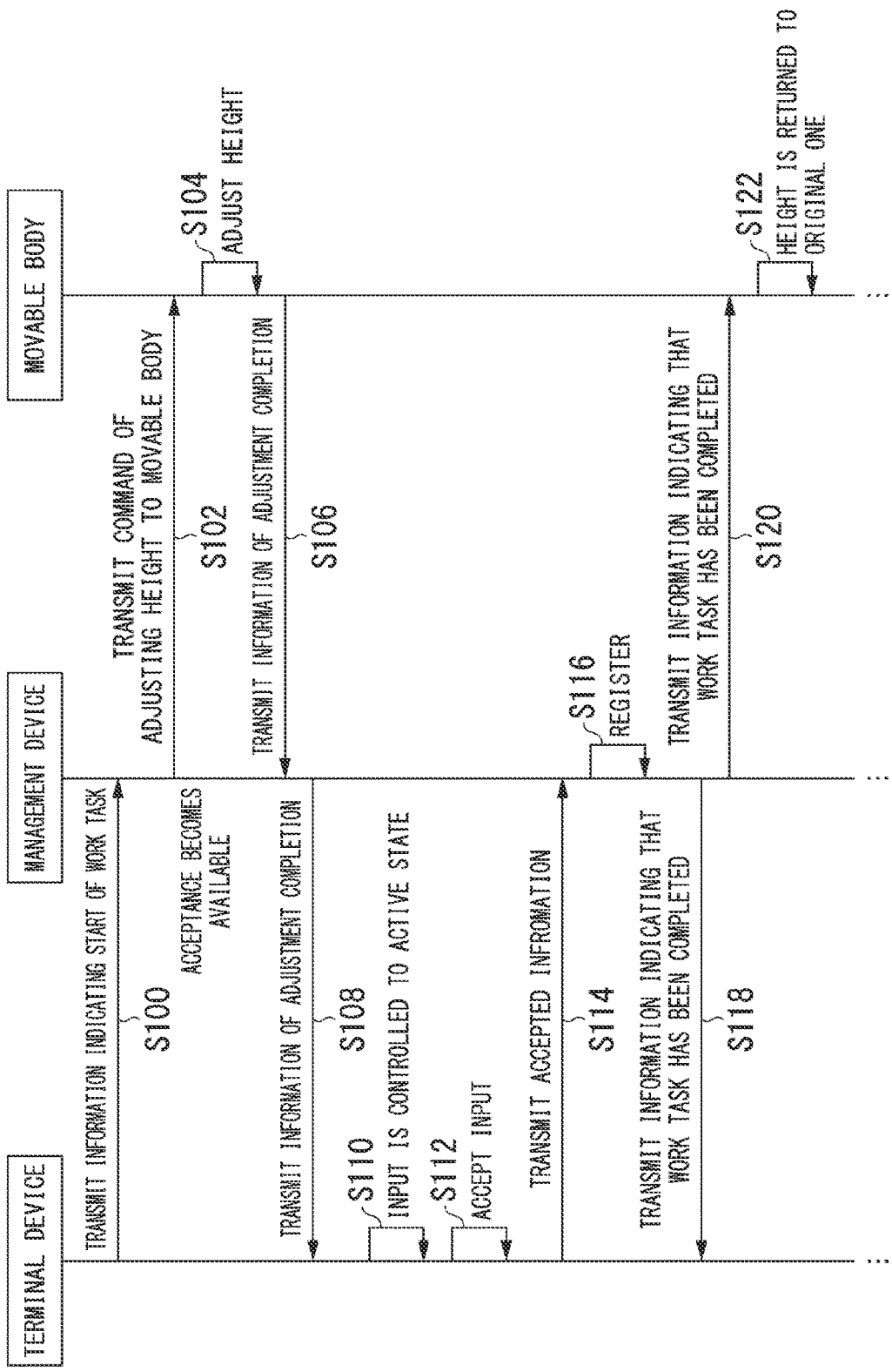
FIG. 12 is a sequence view showing an example of a flow of a process performed by a movable body management system.

FIG. 12 is a sequence view showing an example of a flow of a process performed by the movable body management system 1. First, the terminal device 100 transmits start information indicating the start of a work task to the management device 200 (Step S100). The start information is, for example, information indicating that the icon IC1 has been operated and includes identification information of the instrument as the work target.

Next, the management device 200 transmits a command (information based on the input information) to adjust the height to the movable body 300 when the start information is acquired (Step S102). This command includes information indicating how much the height is to be adjusted. The management device 200 transmits the command, for example, with reference to relevance information in which the height of the instrument is associated with the adjustment degree of the height. The control device 380 of the movable body 300 controls the seat part 306 to a height suitable for the height of a target (instrument) of the work task on the basis of the command. Thereby, the height of the seat part 306 of the movable body 300 is adjusted to a height in accordance with the work task. That is, the height of the movable body 300 is adjusted to a position where the worker can easily view the instrument (a position where the work task can be easily performed).

Next, the movable body 300 adjusts the height of the seat part 306 on the basis of the command in Step S102 (Step S104) and transmits, to the management device 200, information indicating that the adjustment of the height has been completed after the adjustment is completed (Step S106).

When the information transmitted in Step S106 is acquired, the management device 200 transmits the acquired information to the terminal device 100 (Step S108). When the information transmitted in Step S108 is acquired, the terminal device 100 controls the input of the icon IC2 from an inactive state to an active state (Step S110). The inactive state is a state in which the terminal device 100 does not receive information being input to the icon IC2. The active state is a state in which the terminal device 100 accepts information being input to the icon IC2.

After the process of Step S110, the terminal device 100 accepts an input of information to the icon IC2 (Step S112) and transmits the accepted information (for example, information indicated by the instrument) to the management device 200 (Step S114). Next, the management device 200 registers the information transmitted in Step S114 to the instrument information 256 (Step S116). Thereby, the management device 200 deems that the work task with respect to the target equipment has been completed.

When the work task has been completed, the management device 200 transmits information indicating that the work task has been completed to the terminal device 100 and the movable body 300 (Steps S118 and S120). In a case where the movable body 300 acquires the information indicating that the work task has been completed, the height of the seat part 306 is adjusted to a predetermined height or a height before the height is adjusted in Step S102 (Step S122). Then, after the height has been adjusted, in order to perform the next work task, the movable body 300 travels toward a position of the next work target automatically or on the basis of the operation of the worker. At this time, the movable body 300 may use a speaker or the like and report, by way of speech, the information (information of the kind of work task, target equipment, a movement direction, and the like) regarding the next work task on the basis of the information acquired from the management device 200.

The movable body 300 may lower the height of the seat part 306 when acquiring information that is indicated by the equipment and/or information indicating that the worker has confirmed the information indicating the instrument which is provided at the workplace (for example, in a case where information indicating the instrument is input to the terminal device 100 or in a case where the information indicated by the instrument is transmitted to the management device 200) in place of (or in addition to) the information indicating that the work task has been completed.

In this way, the movable body 300 adjusts the height of the movable body 300 in accordance with the progress of the work task, and thereby, convenience to the worker is improved.

According to the first embodiment described above, the control device 380 controls the height of the seat part 306 on the basis of the information based on input information that is input by the worker in accordance with the work task from the terminal device 100, and thereby, convenience to the worker is improved.

The above embodiment is described using an example in which the height of the seat part 306 is controlled on the basis of the information based on the input information. Alternatively, the movable body 300 may control the height of the seat part 306 in a case where the information based on the input information is acquired and further a predetermined condition is satisfied (or in a case where a predetermined condition is satisfied in a state where the information based on the input information is not acquired).

The predetermined condition is, for example, some or all of the following conditions (1) to (6).

(1) The worker performs a predetermined gesture (refer to <First modified example>).
(2) A code which is provided on a work target and which becomes a trigger of an adjustment of height is recognized by the control device 380, the terminal device 100, or the management device 200 (refer to <Second modified example>).
(3) The control device 380, the terminal device 100, or the management device 200 acquires predetermined information from the target (refer to <Second modified example>).
(4) The movable body 300 is present at a predetermined position relative to the work target. The above (4) is, for example, that the movable body 300 is present at a predetermined distance (or a position set relative to the work target) from the work target.
(5) The movable body 300 or the management device 200 recognizes a position of the work target in real time on the basis of an image (refer to <Third modified example>).
(6) A predetermined mechanism which is provided on the work target is operated (refer to <Fourth modified example>).

First Modified Example

Hereinafter, a first modified example is described. In the first modified example, the height of the seat part 306 of the movable body 300 is adjusted by a predetermined gesture (or motion) of the worker. Hereinafter, the difference from the first embodiment is mainly described.

Figure 13:
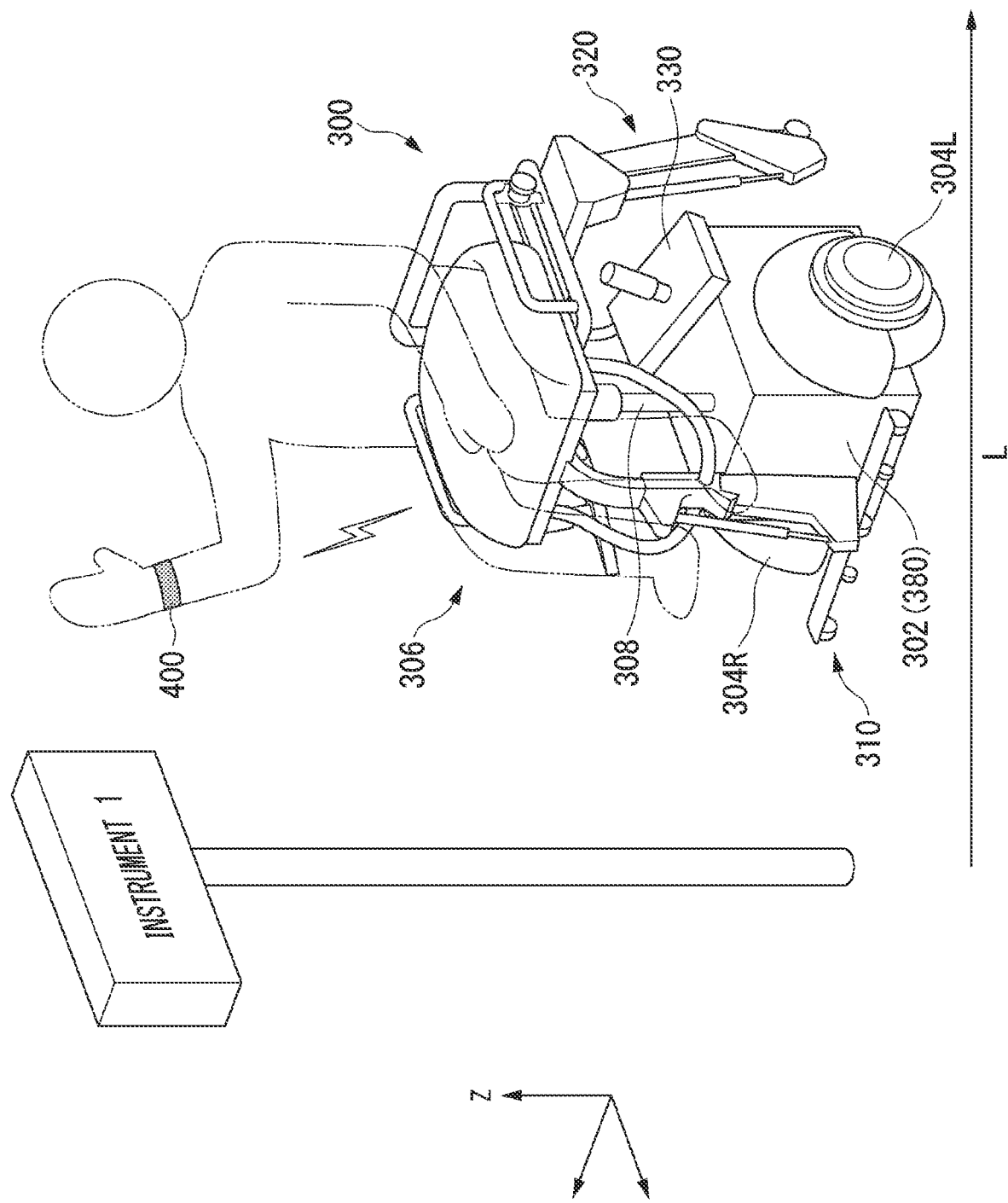
FIG. 13 is a view showing a movable body of a first modified example.

FIG. 13 is a view showing a movable body 300 of the first modified example. A detection device 400 that includes an IMU (Inertial Measurement Unit) and a communication device is attached to the body (for example, the wrist or the arm) of the worker. The detection device 400 communicates with the movable body 300 by using the communication device. The IMU detects information indicating the slope of a target to which the detection device 400 is attached, a movement speed, a rotation state, and the like and provides the detection result to the movable body 300.

The movable body 300 transmits the detection result that is provided by the detection device 400 to the management device 200. The management device 200 estimates the motion of the worker on the basis of the detection result and commands the movable body 300 in accordance with the estimated motion. For example, as shown in FIG. 13, in a case where the worker raises an arm, the management device 200 commands the movable body 300 to raise the height of the seat part 306.

Further, for example, in a case where the worker lowers an arm, the management device 200 commands the movable body 300 to lower the height of the seat part 306. Thereby, the worker can easily adjust the height of the seat part 306.

The above embodiment is described using an example in which the management device 200 commands the movable body 300 to adjust the height of the seat part 306; however, alternatively, the movable body 300 may estimate the motion on the basis of the detection result of the detection device 400 and may adjust the height of the seat part 306 on the basis of the estimation result without intermediating the management device 200. A control part (for example, a CPU) included in the detection device 400 may estimate the motion on the basis of information provided by the IMU.

According to the first modified example described above, height adjustment that further reflects the worker's intention is performed.

As a result, the convenience to the user is further improved. In addition to (instead of) the gesture, the height of the seat part 306 may be controlled on the basis of the speech of the worker. In this case, the movable body 300 analyzes the speech that is input to a microphone or the like and controls the height of the seat part 306 on the basis of the analysis result.

Second Modified Example

Hereinafter, a second modified example is described. In the second modified example, the height of the seat part 306 is adjusted on the basis of information that is provided by a work target. Hereinafter, the difference from the first embodiment is mainly described.

The information that is provided by a work target is, for example, information regarding the adjustment of the height of the seat part 306 that is provided on the work target or that is transmitted to the work target. The information regarding the adjustment of the height is information indicating the height of the instrument, information indicating the height (or degree of operation) of the seat part 306, or information that embodies such information (for example, a QR code (registered trademark), a bar code, or the like).

Figure 14:
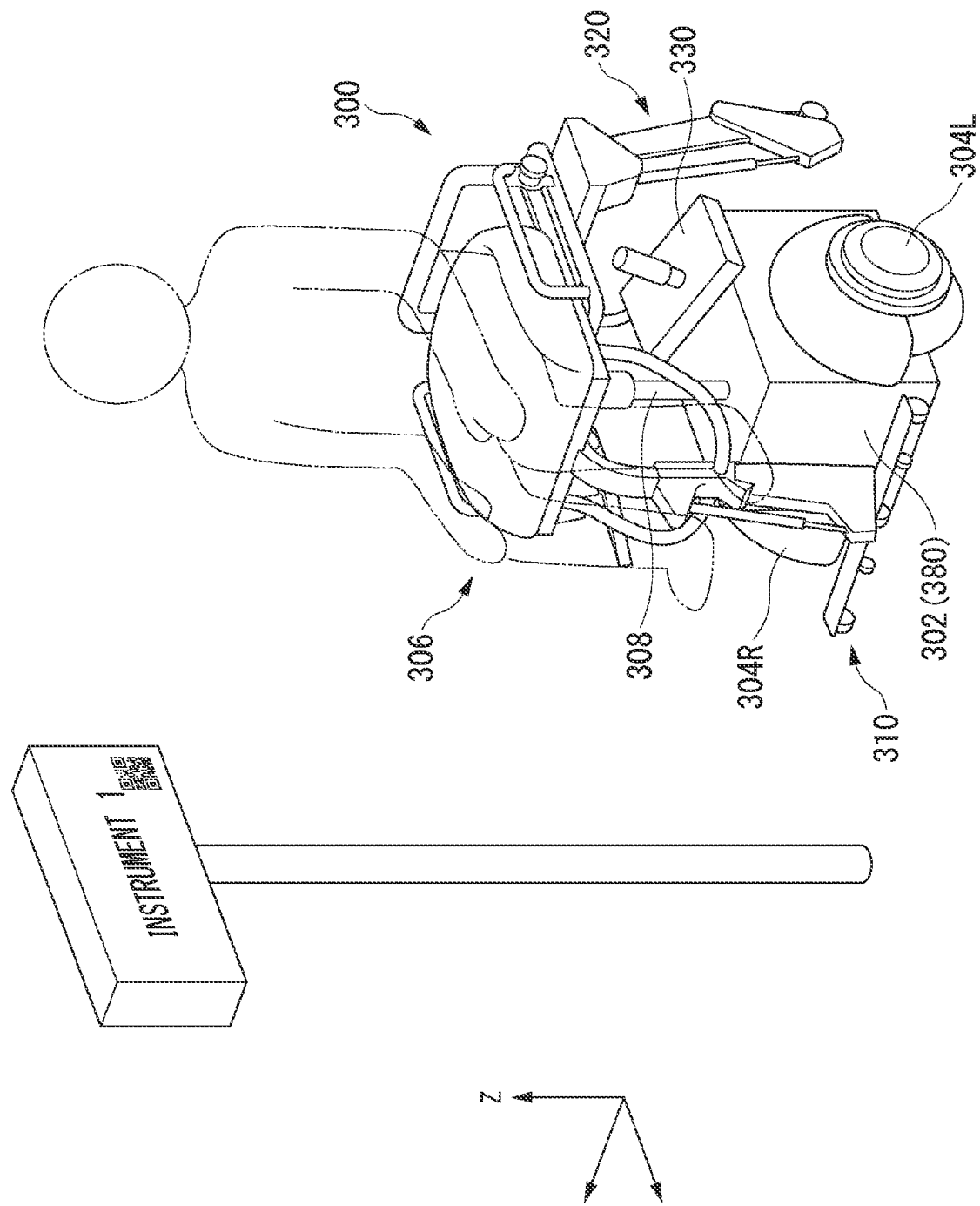
FIG. 14 is a view showing a second modified example.

FIG. 14 is a view showing the second modified example. For example, information indicating the height of the instrument 1 is embodied (encoded) in the QR code of the instrument. For example, when the external sensor 350 of the movable body 300 images the QR code, the recognition part 382 decodes the information of the imaged QR code and recognizes the height of the instrument. The second control part 390 adjusts the height of the seat part 306 on the basis of the recognized height.

The QR code may be imaged by a camera that is provided on the terminal device 100. In this case, the recognition of the height of the instrument by the decoding may be performed by the terminal device 100 or may be performed by another device.

The movable body 300 or the terminal device 100 may communicate with the instrument, the movable body 300 or the terminal device 100 may acquire information for adjusting the height of the seat part 306 acquired from the instrument, and may adjust the height of the seat part 306 on the basis of the acquired information.

According to the second modified example described above, the same advantage as that of the first embodiment is achieved.

Third Modified Example

Hereinafter, a third modified example is described. For example, the recognition part 382 recognizes the height of the instrument on the basis of an image that is imaged by the external sensor 350. Then, the second control part 390 may adjust the height of the seat part 306 on the basis of the height that is recognized by the recognition part 382. For example, the recognition part 382 recognizes the instrument or the height of the instrument on the basis of a learned model such as a neural network. The learned model is a model in which learning data associated with the image where the instrument is imaged and the position (or the height) of the instrument is learned.

According to the third modified example described above, the same advantage as that of the first embodiment is achieved.

Fourth Modified Example

Hereinafter, a fourth modified example is described. For example, in a case where a predetermined operation is performed on the instrument, the movable body 300 adjusts the height of the seat part 306. The predetermined operation is that a door that is provided on the instrument is opened or that a key that is provided on the instrument is operated from a locking condition to an unlocking condition.

Figure 15:
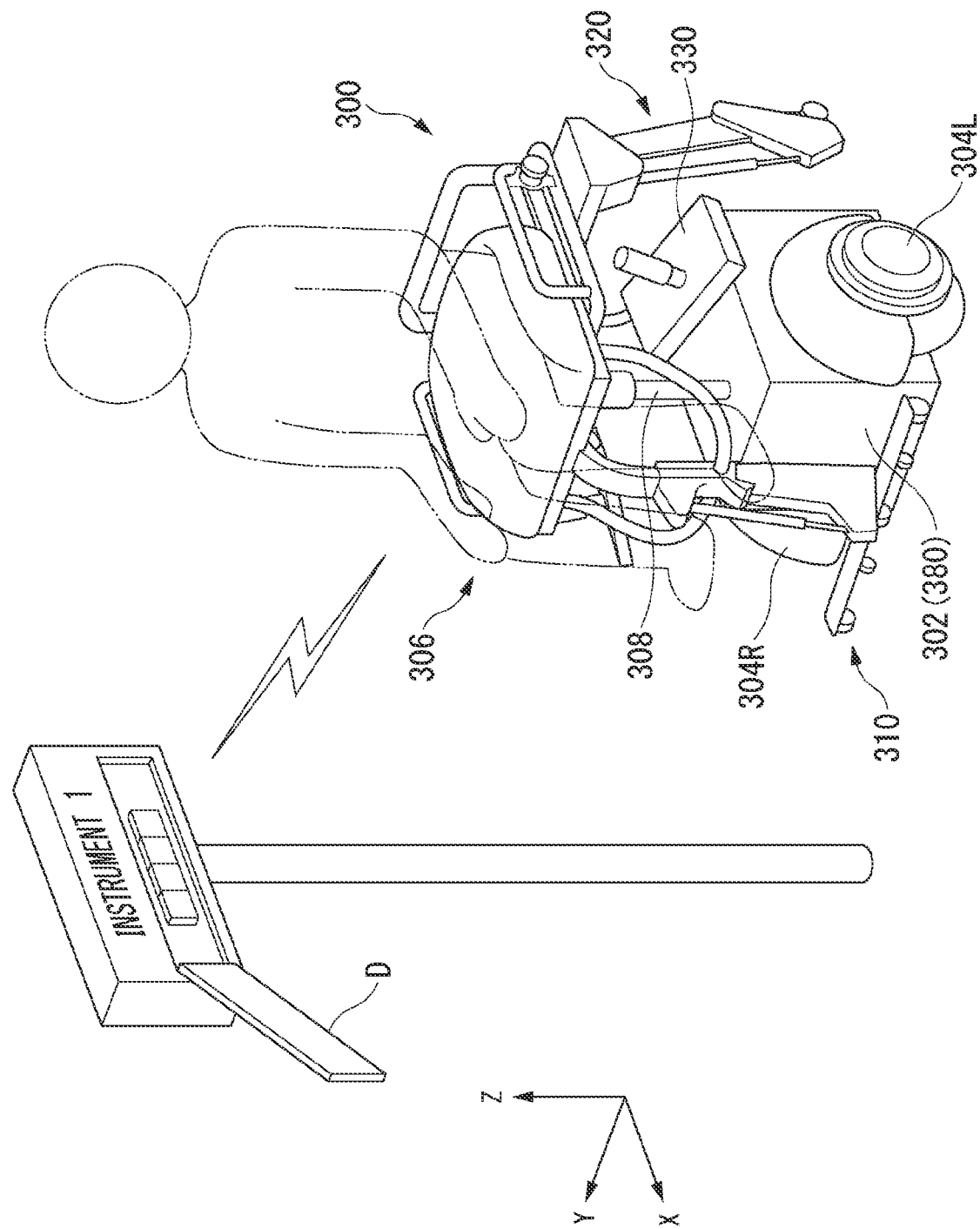
FIG. 15 is a view showing an example of a scene in which the height of the seat part is adjusted in a fourth modified example.

FIG. 15 is a view showing an example of a scene in which the height of the seat part 306 is adjusted in the fourth modified example. For example, a door D is provided on the instrument. When the door D is opened by the worker, a sensor that is provided on the instrument outputs an ON signal to a control part included in the instrument. The control part outputs this ON signal to the movable body 300 (the terminal device 100 or the management device 200). The movable body 300 adjusts the height of the seat part 306 on the basis of an ON signal (a signal acquired through the terminal device 100 or the management device 200). For example, the movable body 300 adjusts the height of the seat part on the basis of information indicating the height included in the ON signal or information indicating the height of the instrument acquired in advance.

According to the fourth modified example described above, the same advantage as that of the first embodiment is achieved.

Fifth Modified Example

Hereinafter, a fifth modified example is described. For example, the management device 200 may change the degree of adjustment of the height of the seat part 306 in accordance with the worker. For example, the management device 200 learns the worker's preference regarding the height adjustment and provides a command regarding the height adjustment to the movable body 300 on the basis of the learning result.

Figure 16:
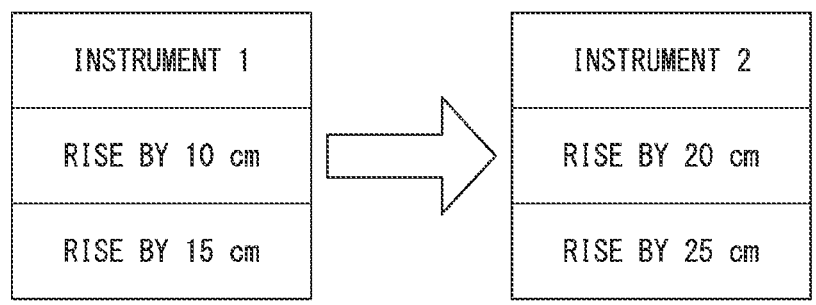
FIG. 16 is a view showing a fifth modified example.

FIG. 16 is a view showing the fifth modified example. For example, the management device 200 raises the height of the seat part 306 by 10 cm on the basis of the height of the instrument 1. Then, since the body height is low, the worker further increases the height of the seat part 306 by 5 cm. In this case, the management device 200 increases, by 5 cm, the degree of adjustment of the height that is set in a default configuration. For example, although in the default configuration, the height of the instrument 2 is raised by 20 cm, the management device 200 raises the height of the seat part 306 by 25 cm automatically in accordance with the worker's preference.

After the preference is set and after a set of work tasks are finished, the worker's preferences may be applied to the next set of work tasks (for example, a set of work tasks on the following day). For example, the management device 200 stores information in which worker's identification information and the worker's preference are associated with each other in the storage part 250 and understands the worker's preference with reference to this information.

The management device 200 may determine the degree of increase in the height of the seat part 306 in accordance with the worker on the basis of the body shape (for example, the body height) of the worker. For example, the management device 200 acquires the body height of the worker and adds 10 cm to the degree of adjustment of the height that is set in a default configuration in a case where the body height of the worker is higher than a reference body height by 10 cm.

According to the fifth modified example described above, the seat part 306 can be controlled to a height that is further suitable for the user.

The embodiments described above may be appropriately combined and performed. Some or all of the functional configurations included in the movable body 300 may be included in the management device 200. Some or all of the functional configurations included in the management device 200 may be included in the movable body 300. The management device 200 may be omitted, and the movable body 300 may control the height of the seat part 306 independently of a command of the management device 200.

The embodiments described above can be represented as follows.

A control device controls a movable body on which a worker performing a work task at a workplace is capable of boarding and which is capable of adjusting the height of a boarding part on which the worker boards, the control device including a storage device that stores a program and a hardware processor and being configured to: acquire, from a terminal device that is carried by the worker and that accepts information which is input by the worker in accordance with the work task, information based on input information which is input by the worker in accordance with the work task; and control the height of the boarding part based on the information which is acquired by the acquisition part by executing the program.

Although the embodiments have been described with reference to the drawings, the present invention is not limited to such embodiments, and various modifications and substitutions can be made without departing from the scope of the invention.

What is claimed is:

1. A movable body control device that controls a movable body on which a worker performs a work task at a workplace, which movable body control device adjusts a height of a boarding part on which the worker boards, the movable body control device comprising:
   an acquisition part that acquires first information, from a terminal device that is carried by the worker and that accepts the first information having been input by the worker in accordance with the work task,
   wherein the first information is input by the worker in accordance with the work task,
   wherein the first information is based on input information having been indicated by a plurality of instruments within a facility, and
   wherein the input of the first information corresponds to a confirmation of the input information by the worker; and
   a control part that controls the height of the boarding part based on the first information acquired by the acquisition part,
   wherein the input information is second information indicating that the work task has started, second information that is indicated by an instrument as a target of the work task, or second information indicating that the work task has been completed,
   wherein, in a case where the second information indicating that the work task has started is acquired as the first information, the control part raises the height of the boarding part to a position for viewing of the instrument, by the worker, which instrument the worker is going to confirm among the plurality of instruments as the work task, and
   wherein the position controlled by the control part is based on recognition of the instrument based on analysis of an image provided by an image sensor of the movable body control device.

2. The movable body control device according to claim 1, wherein the control part lowers the height of the boarding part in a case where the information that is indicated by the instrument is acquired, in a case where the information indicating that the worker has confirmed the information that is indicated by the instrument which is provided at the workplace is acquired, or in a case where the information indicating that the work task has been completed is acquired.

3. The movable body control device according to claim 1, wherein the control part controls the height of the boarding part in a case where a predetermined condition in addition to acquiring the information based on the input information is further satisfied, and
the predetermined condition includes some or all of:
that the worker performs a predetermined gesture;
that a code which is provided on a target of the work task and which becomes a trigger of an adjustment of height is recognized by the movable body control device or a device capable of communicating with the movable body control device;
that the movable body control device or the device capable of communicating with the movable body control device acquires predetermined information from the target;
that the movable body control device is present at a predetermined position relative to the target;
that the movable body control device or the device capable of communicating with the movable body control device recognizes a position of the target in real time based on an image; and
that a predetermined mechanism which is provided on the target is operated.

4. The movable body control device according to claim 1, wherein the control part controls the height of the boarding part based on a height of a target of the work task.

5. The movable body control device according to claim 1, wherein the control part controls the height of the boarding part in consideration of a body shape of the worker or a preference of the worker.

6. The movable body control device according to claim 1, wherein the position controlled by the control part is further based on recognition of a height of the instrument based on the analysis of the image.

7. The movable body control device according to claim 1, wherein the movable body control device further comprises a recognition element that outputs the recognition of the instrument based on the image and on employing a learned model trained on positioning of the plurality of instruments.

8. A movable body on which a movable body control device that controls the movable body on which a worker performs a work task at a workplace, which movable body control device adjusts a height of a boarding part on which the worker boards is mounted, the movable body control device comprising:
- an acquisition part that acquires first information, from a terminal device that is carried by the worker and that accepts the first information having been input by the worker in accordance with the work task,
- wherein the first information is input by the worker in accordance with the work task,
- wherein the first information is based on input information having been indicated by a plurality of instruments within a facility, and
- wherein the input of the first information corresponds to a confirmation of the input information by the worker; and
- a control part that controls the height of the boarding part based on the first information acquired by the acquisition part,
- wherein the input information is second information indicating that the work task has started, second information that is indicated by an instrument as a target of the work task, or second information indicating that the work task has been completed,
- wherein, in a case where the second information indicating that the work task has started is acquired as the first information, the control part raises a position for viewing of the instrument, by the worker, which instrument the worker is going to confirm among the plurality of instruments as the work task, and
- wherein the position controlled by the control part is based on recognition of the instrument based on analysis of an image provided by an image sensor of the movable body control device.

9. The movable body according to claim 8, wherein the movable body comprises:
- a travel part that is located on a ground at a time of traveling; and
- a first support part and a second support part that are located on the ground at least in a case where the height of the boarding part is controlled.

10. A movable body management system, comprising:
- a movable body control device that controls a movable body on which a worker performs a work task at a workplace, which movable body control device adjusts a height of a boarding part on which the worker boards; and
- a server device that acquires input information from a terminal device and that provides information generated based on the acquired input information to the movable body control device,
- the movable body control device comprising:
  - an acquisition part that acquires, from the terminal device that is carried by the worker and that accepts first information having been input by the worker in accordance with the work task,
  - wherein the first information is input by the worker in accordance with the work task,
  - wherein the first information is based on input information having been indicated by a plurality of instruments within a facility, and
  - wherein the input of the first information corresponds to a confirmation of the input information by the worker; and
  - a control part that controls the height of the boarding part based on the first information acquired by the acquisition part,
  - wherein the input information is second information indicating that the work task has started, second information that is indicated by an instrument as a target of the work task, or second information indicating that the work task has been completed,
  - wherein, in a case where the second information indicating that the work task has started is acquired as the first information, the control part raises the height of the boarding part to a position for viewing of the instrument, by the worker, which instrument the worker is going to confirm among the plurality of instruments as the work task; and
  - wherein the position controlled by the control part is based on recognition of the instrument based on analysis of an image provided by an image sensor of the movable body control device.

11. A movable body control method by way of a computer that controls a movable body on which a worker performs a work task at a workplace, which movable body is associated with a moveable body control device that adjusts a height of a boarding part on which the worker boards, the movable body control method comprising:
- acquiring, from a terminal device that is carried by the worker and that accepts information which is input by the worker in accordance with the work task, first information having been input by the worker in accordance with the work task,
- wherein the first information is based on input information having been indicated by a plurality of instruments within a facility, and
- wherein the input of the first information corresponds to a confirmation of the input information by the worker; and
- controlling the height of the boarding part based on the first information acquired,
- wherein the input information is second information indicating that the work task has started, second information that is indicated by an instrument as a target of the work task, or second information indicating that the work task has been completed,
- wherein, in a case where the second information indicating that the work task has started is acquired as the first information, the control part raises the height of the boarding part to a position for viewing of the instrument, by the worker, which instrument the worker is going to confirm among the plurality of instruments as the work task, and
- wherein the position controlled by the controlling is based on recognition of the instrument based on analysis of an image provided by an image sensor of the movable body control device.

12. A computer-readable non-transitory recording medium which includes a program causing a computer that controls a movable body on which a worker performs a work task at a workplace, which movable body is associated with a moveable body control device that adjusts a height of a boarding part on which the worker boards to:
- acquire, from a terminal device that is carried by the worker and that accepts information which is input by the worker in accordance with the work task, first information having been input by the worker in accordance with the work task, wherein the first information is based on input information having been indicated by a plurality of instruments within a facility, and wherein the input of the first information corresponds to a confirmation of the input information by the worker; and control, by a control part, the height of the boarding part based on the first information acquired, wherein the input information is second information indicating that the work task has started, second information that is indicated by an instrument as a target of the work task, or second information indicating that the work task has been completed, wherein, in a case where the second information indicating that the work task has started is acquired as the first information, the control part raises the height of the boarding part to a position for viewing of the instrument, by the worker, which instrument the worker is going to confirm among the plurality of instruments as the work task, and wherein the position controlled by the control part is based on recognition of the instrument based on analysis of an image provided by an image sensor of the movable body control device.

\* \* \* \* \*